United States Patent [19]

Loveless

[11] 3,901,861

[45] Aug. 26, 1975

[54] MOLECULAR WEIGHT JUMPING OF ELASTOMERIC POLYMERS

[75] Inventor: Frederick Charles Loveless, Cheshire, Conn.

[73] Assignee: Uniroyal, Inc., New York, N.Y.

[22] Filed: Nov. 7, 1973

[21] Appl. No.: 413,750

[52] U.S. Cl............ 260/83.7; 260/85.1; 260/94.2 R; 260/94.7; 260/96 R
[51] Int. Cl............................................. C08d 5/04
[58] Field of Search.. 260/94.7 HA, 94.7 A, 94.2 R, 260/83.7

[56] References Cited
FOREIGN PATENTS OR APPLICATIONS
992,210  5/1965  Canada............................ 260/94.7
1,032,534  6/1966  United Kingdom................ 260/94.7

OTHER PUBLICATIONS

"Molecular Jump Reaction," by Engel et al., Rubber Age, December 1964, pp. 410–415.

Primary Examiner—William F. Hamrock
Attorney, Agent, or Firm—Willard R. Sprowls, Esq.

[57] ABSTRACT

Disclosed is a method of effecting jumping of the molecular weight of elastomeric unsaturated hydrocarbon polymers by treating such polymers while in fluid form and under substantially anhydrous conditions with a catalyst system comprising: (1) a peroxy acid, and (2) an inorganic Lewis acid which preferably is boron trifluoride complexed with an oxygen-containing organic compound (most preferably boron trifluoride etherate), in such a manner that jumping of the molecular weight of the polymer occurs but gelation thereof is absent. The jumping reaction takes place rapidly, even at room temperature, and is essentially non-exothermic. The catalyst system is then rendered ineffective, almost invariably by "killing" the Lewis acid component thereof, as by the addition of water or a water-soluble base which, in the case of boron trifluoride etherate or similar complex, destroys the boron trifluoride content thereof. The polymer content of the mixture, which has a jumped molecular weight but is free from gel, is completely soluble in benzene and other organic solvents in which the starting polymer was soluble, and is vulcanizable, may be recovered from the mixture in any suitable way as by neutralizing the acidity of the mixture, then floccing the polymer with an alcohol solution of an antioxidant, and drying the flocced polymer.

12 Claims, No Drawings

MOLECULAR WEIGHT JUMPING OF ELASTOMERIC POLYMERS

BACKGROUND OF THE INVENTION

Field of the Invention

The field of the invention is the molecular weight jumping of elastomeric unsaturated hydrocarbon polymers. As is well-known in the art of elastomeric polymer chemistry, the term "jump" and its derivatives refer to techniques by which the molecular weight of such polymers is significantly increased.

It is well-known to polymer chemists that it is most difficult and uneconomical to produce high molecular weight polymers directly, using solution polymerization processes, because of the extremely high solution viscosities of high molecular weight polymers. In such situations, one encounters difficulties of agitation, possible introduction of heterogeneity in the polymerizing system, and a drastic reduction in heat transfer rate. Therefore, direct polymerization to high molecular weight polymer necessitates production of polymer at lower rates by using lower ratios of solids to solvent in the reactor. Such a technique increases significantly the cost of polymer finishing.

A technique by which elastomeric polymers of high molecular weight can be produced through the use of polymer solutions having a high ratio of polymer to solvent, without incurring the problems of extremely high solution viscosity and the attendant difficulties of agitation, heterogeneity and heat transfer is obviously most advantageous. This is achieved by the method of the present invention, as detailed below. This method permits the initial production of low molecular weight polymers at high solids concentration by usual methods, followed by conversion of these polymers to high molecular weight polymers by my method, while maintaining lower solution viscosity and higher heat transfer rates than are possible by the usual direct methods of making high molecular weight polymers. Therefore, overall polymer productivity is increased. Other advantages of polymers having jumped molecular weight are their lower cold flow and their greater capacity to be extended with oil.

It will be seen that the method of the present invention is advantageous because it provides a simple, effective, and economical method of jumping the molecular weight of polymers of relatively low molecular weight made by solution polymerization techniques.

Various reagents have been used for jumping the molecular weight of elastomeric unsaturated hydrocarbon polymers and copolymers, including the following combinations:

an alkylaluminum halide, and water, an alcohol, an organic or inorganic acid, or acid halide, or other compound having active hydrocarbon (Engel, Schafer, and Kiepert, *Rubber and Plastics Age*, December, 1964, pages 1499–1502);

a haloalkane, a dialkenyl compound, and an alkali metal catalyst (Dutch patent application No. 69.04792, dated Sept. 30, 1969);

a polar compound and butyl lithium (Dutch patent application No. 69.04747, dated Sept. 30, 1969);

a cobalt compound and an organo-aluminum compound (Ring and Cantow, *Rubber Chemistry and Technology*, vol. 40, 1967, pages 895–908);

an aryldiazonium halide and a Lewis acid from the halides and organic halogen compounds of boron, tin, lead, iron, phosphorus, etc. (U.S. Pat. No. 3,506,638);

an organometallic compound and an arylazo or arylhydrazo compound (U.S. Pat. No. 3,086,000).

SUMMARY OF THE INVENTION

The method of effecting molecular weight jumping which constitutes the present invention involves treating an elastomeric unsaturated hydrocarbon polymer, in fluid form, and under substantially anhydrous conditions, with a catalyst system comprising: (1) an organic peroxy acid, and (2) an inorganic Lewis acid, the inorganic acid of choice being boron trifluoride etherate. The catalyst system is of such composition and is employed in such amount and under such conditions as to cause jumping of the molecular weight of the starting polymer to the desired extent, without causing any gelation of the polymer. The catalyst system is then rendered ineffective, typically by quenching the inorganic Lewis acid component thereof with water. The polymer content of the mixture may be recovered in any suitable way, typically by neutralizing the acidity of the mixture with a suitable neutralizing agent, floccing the polymer with an alcohol colution of an antioxidant, and drying the flocced polymer. The polymer thus produced has a jumped molecular weight but is free from gel, is completely soluble in benzene or other solvent in which the starting polymer was soluble, and is vulcanizable. The gel-free polymer of jumped molecular weight (compared to the molecular weight of the starting polymer) is ready to be used in any of the ways in which elastomeric polymers are used in the arts. It can be compounded, shaped, and cured in accordance with conventional techniques used in the rubber industry.

DESCRIPTION OF THE PREFERRED EMBODIMENTS

The invention is applicable for achieving molecular weight jumping of an elastomeric unsaturated hydrocarbon polymers, whether homopolymers or copolymers. It is applicable generally to polybutadienes regardless of their microstructure, for example, emulsion polybutadiene or polybutadiene having a high cis content such as cis-1,4-polybutadiene. It is applicable also to such copolymer rubbers as styrene-butadiene rubbery copolymers (SBR), and butyl rubber, and to natural rubber and synthetic cis-1,4-polyisoprene. It is also applicable to other unsaturated hydrocarbon polymers such as the rubbery interpolymers of at least two alpha-monoolefins, e.g., ethylene, propylene, etc., and at least on copolymerizable diene, e.g. dicyclopentadiene, 1,4-hexadiene, 1,9-octadecadiene, 5-ethylidiene-2-norbornene, 1,5-cyclooctadiene, and 1,3-butadiene. Such interpolymers are particularly exemplified by the so-called EPDM rubbers which are terpolymers of ethylene, propylene, and a diene such as one of those just mentioned.

As indicated above, the polymer is in liquid form when it is subjected to the jumping reaction of the invention. If normally solid, the polymer is dissolved in a suitable inert organic liquid, almost invariably a readily volatilizable solvent for the starting elastomer. If the polymer is of such relatively low molecular weight that it is itself fluid, it is not necessary that it be dissolved in a solvent. Typically, the process of the invention is applied to the cement, i.e., the solution of elastomer in a volatile organic solvent, which results from solution polymerization. However, the invention can also be practiced with rubbers prepared by methods other than solution polymerization, e.g., with emulsion-polymerized diene homopolymers or copolymers, including butadiene-styrene copolymer and other polymers such as are enumerated above which are prepared by emulsion polymerization techniques. In such case, the polymer is recovered in dry form from the polymerization mixture and is then dissolved in a suitable organic liquid in preparation for the jumping technique of the invention.

Suitable solvents include the saturated aliphatic hydrocarbon solvents such as straight and branched-chain paraffins, as well as cycloparaffins containing from 1 to 16 carbon atoms per molecule, such as propane, butane, pentane, hexane, heptane, dodecane, cyclopentane, cyclohexane, methyl cyclohexane, mixed paraffinic solvents such as petroleum ether, naphthas such as the well-known V.M. & P. naphtha, and the like. Aromatic solvents such as benzene, toluene, the several xylenes and the like are also operable. Other solvents which may be used are the halogenated couterparts of the aliphatic, cycloaliphatic and aromatic solvents mentioned above, e.g., ethylene chloride, chloroform, ethyl chloride, carbon tetrachloride, trichloroethylene, chlorocyclohexane, chlorobenzene, o-dichlorobenzene, chlorotoluene, and the corresponding bromo, fluoro and iodo derivatives and the like.

The organic peroxy acid employed as one component of the catalyst system used in the jump reaction of the invention may be any convenient or readily available acid, examples being peroxyacetic acid, peroxybenzoic acid, and meta-chloroperoxybenzoic acid.

The inorganic Lewis acid component of the catalyst system is most preferably a complex of boron trifluoride with an oxygen-containing organic compound, particularly boron trifluoride etherate. While the boron trifluoride may be complexed with any organic ligand which does not prevent its effectiveness for the jumping reaction, boron trifluoride etherate is eminently suitable for use in the present invention.

The amount of each of the two catalyst components which are used in practicing the invention is generally from 0.3 to 10.0 parts (by weight) per 100 parts of elastomeric polymer, and usually is between 1.5 and 5.0 parts.

The amount of the two-component catalyst system employed in the practice of the invention may vary with the type of elastomeric polymer which is to be jumped, the molecular weight of the starting elastomeric polymer (lower molecular weights requiring more catalyst), and the degree of molecular weight jumping desired (higher degree requiring more catalyst). The amount of each catalyst system component used may also vary with the nature and amount of interfering or catalyst-consuming impurities present in the system, particularly in the starting elastomer. By routine checking of the jumped-molecular-weight polymers produced, it may readily be determined what are the maximum amounts of catalyst that may be used without incurring gelation under a given set of reaction conditions.

The type of unsaturation of the starting elastomer is an important factor in determining the amount of catalyst components required. For example, an EPDM polymer which is based on 5-ethylidene-2-norbornene as the third monomer requires less of the jumping reagents (i.e., catalyst system components) than a corresponding EPDM polymer based on such third monomers as dicyclopentadiene or 1,4-hexadiene.

The degree of jumping achieved by the practice of the invention can vary widely. In the case of a starting polymer having a Mooney viscosity (ML-4 at 212°F.) below 25 or 30, it is often desirable to effect jumping to such an extent that the recovered polymer has a Mooney of at least 60, and more commonly around 100. In the case of polymers which have Mooney viscosity values from 40 to 75 or 80, it is desirable to jump the molecular weights so that the final product has a Mooney viscosity of at least 90 and often of more than 100.

In the preferred practice of the invention, the molecular weight jumping reaction proceeds rapidly at room temperature on freshly prepared polymer cement. The duration of the reaction may vary from 30 seconds up to 2½ hours.

The jumping reaction of the present invention should be carried out under completely anhydrous or substantially anhydrous conditions. The presence of any significant amount of water in the reaction system is undesirable because it destroys the boron trifluoride etherate catalyst.

In practicing the invention, the starting polymer is simply contacted with the catalyst system in any suitable manner, preferably at ambient or room temperature. The peroxy acid and the inorganic Lew acid are conveniently added separately to the polymer solution, as dilute solutions in the same solvent as that used in preparing the polymer. Preferably, I add the Lewis acid first and then the peroxy acid, so as to suppress gelation. The jump reaction proceeds rapidly at room or ambient temperature, and is essentially non-exothermic. There is no formation of gel in the polymer. The resulting mixture is treated so as to quench the catalyst system, i.e., render it ineffective, this almost invariably being accomplished by destroying the inorganic Lewis acid, as by adding water when the acid is boron trifluoride etherate. The gel-free elastomeric polymer of jumped molecular weight which is contained in the resulting mixture is then recovered in any suitable manner, as by neutralizing acidic materials present with a suitable neutralizing agent and floccing the rubbery polymer, as by mixing the neutralized mixture with a suitable alcohol containing an antioxidant. The resulting jumped polymer is then dried and is ready for use in the fabrication of cured rubber articles by compounding it with compounding and curing agents, shaping and curing in the conventional ways.

The invention is further illustrated by the following examples which should not, however, be construed as limiting the scope of the invention.

EXAMPLE 1

This example demonstrates the molecular weight jumping of cis-polybutadiene, using metachloroperoxybenzoic acid and boron trifluoride etherate as the catalyst.

To 100 ml. of a benzene solution containing 5.0 grams of cis-1,4-polybutadiene was added 0.2 ml. of a 10% solution of boron trifluoride etherate, and 0.5 ml. of a 10% solution of metachloroperoxybenzoic acid was added, with rapid stirring. After 2½ hours, the reaction was shortstopped with tetramethylethylenediamine, and flocced by pouring it into isopropyl alcohol containing Santowhite crystals [4,4-thiobis-(6-tert.-butyl-m-cresol)], a commercial antioxidant marketed by Monsato Chemical Company. Analysis showed the intrinsic viscosity had increased from 2.31 to 3.53, and the molecular weight had increased from $17.4 \times 10^4$ to $44.8 \times 10^4$.

EXAMPLE 2

This example demonstrates the effect of varying the level of metachloroperoxybenzoic acid and maintaining the same level of boron trifluoride etherate as in Example 1. To 100 ml. of a benzene solution containing 5.0 grams of cis-1,4-polibutadiene, was added 0.2 ml. of a 10% solution of boron trifluoride etherate and 1.0 ml. of a 10% solution of metachloroperoxybenzoic acid, with rapid stirring. After two hours, the reaction was stopped and the rubber solution flocced and dried, according to the procedure described in Example 1. Analysis showed the intrinsic viscosity had increased from 2.31 to 2.82, while the molecular weight had increased from $17.4 \times 10^4$ to $29.7 \times 10^4$.

The experiment was repeated, except that 2.0 ml. of the peroxyacid was added to the rubber solution, and the reaction was allowed to proceed for five minutes, at which time the rubber was flocced and dried, according to the procedure described in Example 1. The jumped rubber had an intrinsic viscosity of 2.44, and a molecular weight of $48.5 \times 10^4$.

EXAMPLE 3

This example demonstrates the molecular weight jumping of a low molecular weight butadiene-styrene block copolymer containing 10% styrene, using the same catalysts as in Example 1.

To 50 ml. of a benzene solution containing 5.0 grams of said block copolymer was added 1.0 ml. of a 10% solution of boron trifluoride etherate and 2.0 ml. of a 10% solution of metachloroperoxy benzoic acid, with rapid stirring. After 20 minutes, a shortstop was added, and the rubber solution flocced and dried, as in Example 1. The dried jumped rubber exhibited no cold-flow and was of higher molecular weight as judged by the increase in intrinsic viscosity from 0.41 to 0.69.

EXAMPLE 4

This example demonstrates changes in ultimate molecular weight attainable from a low-Mooney cis-BR by variations in the level of jumping reagents used. The starting (unjumped) elastomer in the following series had a molecular weight of about 140,000 and a Mooney viscosity of about 24. Samples of approximately 240 g. of rubber (as an 8% toluene solution) were treated for 25 minutes with varying levels of peroxyacetic acid and $BF_3$ etherate. The mole ratio of peroxyacetic acid to $BF_3$ was 1/1. The following table illustrates the results obtained.

the ultimate Mooney viscosity attained is dependent on the level of reagent used.

EXAMPLE 5

This example demonstrates the variation in molecular weight jumping attained at a given reagent level with variations in duration of reaction. The following series describes treatment of a relatively low molecular weight cis-polybutadiene (ML-4 at 212° = 24, Mn = 140,000) with peroxyacetic acid and $BF_3$ etherate where the mole ratio of peroxy acid to $BF_3$ is 1/1, and 8.55 moles of each reagent is utilized per mole of polymer. Approximately 240-gram samples of the cis-polybutadiene (as an 8% solution in toluene) were treated with 14.4 millimoles of $BF_3$ etherate followed by 14.4 millimoles of peroxyacetic acid, and the reaction was shortstopped at various times, adding diethylamine. The rubbers were then flocculated in isopropanol containing 1% of Flexone 5-L antioxidant (N-phenyl-N'-sec.-butyl-p-phenylene diamine, marketed by Uniroyal Chemical). Resulting ML-4 and cement viscosity demonstrated that the extent of molecular weight enhancement increased with time of reaction.

| Sample | Duration of Reaction | Cement Viscosity (CPS) | ML-4 at 212° of Product |
|---|---|---|---|
| A | 0 (control) | 330 | 24 |
| B | 6 minutes | 920 | 66 |
| C | 10 minutes | 1920 | 114 |
| D | 14 minutes | 2000 | 130 |

While the foregoing indicates that boron trifluoride etherate is the preferred inorganic Lewis acid, it will be obvious to those skilled in the art that other complexes of boron trifluoride with oxygen-containing organic compounds can be used. For example, complexes of boron trifluoride with other ethers may be employed.

From the foregoing it will be seen that the present invention provides a simple, highly effective, rapid, and economical method of jumping the molecular weight of elastomeric unsaturated hydrocarbon polymers without concomitant formation of gel.

The rubbery polymers of jumped molecular weight resulting from the practice of the invention can be used as the rubbery component in the production of rubber articles of any kind. Examples are tires, conveyor belts, power transmission belts of any kind such as V-belts, toothed positive drive belts, combined V-belts and toothed positive drive belts serving to synchronously drive with the toothed side and having one or preferably a plurality of V-belt driving surfaces on the other

| Sample | Grams of Rubber | Mmoles Peroxyacetic Acid | Mmoles $BF_3$ Etherate | Duration of Reaction | ML-4 at 212° of Product | Moles of Catalyst per Mole of Polymer |
|---|---|---|---|---|---|---|
| A | 240 | 16.5 | 16.5 | cement gelled instantly | — | 10:1 |
| B | 240 | 13 | 13 | 25 min. | 156 | 8:1 |
| C | 240 | 11.3 | 11.3 | 25 min. | 90 | 7:1 |
| D | 240 | 9.4 | 9.4 | 25 min. | 73 | 6:1 |
| E | control | — | — | — | 24 | — |

Clearly, the level of reagent above which gellation occurs is readily discernible. Also, it can be seen that side, tires, inner tubes, rubber-coated fabrics, etc. In use, they are simply compounded with known compounding and vulcanizing agents, with or without oil extension, shaped and vulcanized in the conventional fashion.

The terms "floccing" and "flocced" used herein are art-accepted terms commonly used in the art of working up polymers following polymerization. They are short forms of "flocculating" and "flocculated," respectively, the verb "flocculate" being substantially equivalent in meaning to the verb "coagulate."

What is claimed is:

1. The method which comprises treating an elastomeric unsaturated hydrocarbon polymer in fluid form and under substantially anhydrous conditions with a catalyst system comprising: (1) an organic peroxy acid which is boron trifluoride complexed with an oxygen-containing compound, and (2) an inorganic Lewis acid which is boron trifluoride complexed with an oxygen-containing compound, said catalyst system being of such composition and being employed in an amount and under such conditions as to cause jumping of the molecular weight of said polymer without causing gelation of said polymer, thereafter rendering said catalyst system ineffective, and recovering the polymer contained in the resulting mixture, the recovered polymer having a jumped molecular weight, being free from gel, being completely soluble in benzene, and being vulcanizable.

2. The method of claim 1 wherein said Lewis acid is boron trifluoride etherate.

3. The method of claim 1 wherein said polymer is polybutadiene.

4. The method of claim 1 wherein said polymer is cis-1,4-polybutadiene.

5. The method of claim 1 wherein said polymer is SBR.

6. The method of claim 1 wherein said polymer is polybutadiene.

7. The method of claim 3 wherein said polymer is cis-1,4-polybutadiene.

8. The method of claim 3 wherein said polymer is SBR.

9. The method of claim 3 wherein said polymer is polybutadiene.

10. The method of claim 2 wherein the polymer subjected to treatment with said catalyst system is in solution in a volatile organic solvent.

11. The method of claim 1 wherein said peroxy acid is peroxyacetic acid.

12. The method of claim 1 wherein said peroxy acid is meta-chloro-peroxybenzoic acid.

* * * * *

UNITED STATES PATENT AND TRADEMARK OFFICE
CERTIFICATE OF CORRECTION

PATENT NO. : 3,901,861
DATED : August 26, 1975
INVENTOR(S) : Frederick C. Loveless It is certified that error appears in the above-identified patent and that said Letters Patent are hereby corrected as shown below:

Column 8, line 11: "claim 1" should read --claim 2--;

lines 13 and 15: "claim 3" should read --claim 2--;

cancel lines 17 and 18 (claim 9), and rewrite as follows: --9. The method of claim 1 wherein the polymer subjected to treatment with said catalyst system is in solution in a volatile organic solvent.--

Signed and Sealed this twenty-seventh Day of April 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,901,861
DATED : August 26, 1975
INVENTOR(S) : Frederick C. Loveless It is certified that error appears in the above-identified patent and that said Letters Patent are hereby corrected as shown below:

Col. 7, lines 15-16, delete "which is boron trifluoride complexed with an oxygen-containing compound".

Signed and Sealed this

*twenty-third* Day of *August 1977*

[SEAL]

Attest:

RUTH C. MASON
*Attesting Officer*

C. MARSHALL DANN
*Commissioner of Patents and Trademarks*